(12) United States Patent
Kawaguchi

(10) Patent No.: US 10,244,128 B2
(45) Date of Patent: Mar. 26, 2019

(54) IMAGE FORMING SYSTEM INCLUDING IMAGE FORMING APPARATUS THAT CAN PROHIBIT ENTRY INTO SLEEP MODE, CONTROL METHOD FOR IMAGE FORMING APPARATUS IN SYSTEM CONCERNED, AND STORAGE MEDIUM STORING CONTROL PROGRAM FOR IMAGE FORMING APPARATUS

(71) Applicant: CANON KABUSHIKI KAISHA, Tokyo (JP)

(72) Inventor: Tadashi Kawaguchi, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 15/608,172

(22) Filed: May 30, 2017

(65) Prior Publication Data

US 2017/0264757 A1  Sep. 14, 2017

Related U.S. Application Data

(63) Continuation of application No. 14/927,569, filed on Oct. 30, 2015, now abandoned.

(30) Foreign Application Priority Data

Nov. 10, 2014 (JP) ................................. 2014-227876

(51) Int. Cl.
*H04N 1/00* (2006.01)
*G06K 15/00* (2006.01)

(52) U.S. Cl.
CPC ..... *H04N 1/00222* (2013.01); *G06K 15/4025* (2013.01); *G06K 15/4055* (2013.01);
(Continued)

(58) Field of Classification Search
None
See application file for complete search history.

(56) References Cited

U.S. PATENT DOCUMENTS 9,128,711 B2 * 9/2015 Pang ..................... G06F 1/3253
2007/0058190 A1  3/2007 Harumichi
(Continued)

FOREIGN PATENT DOCUMENTS

JP  2007310796 A  11/2007
JP  2014104654 A  6/2014

OTHER PUBLICATIONS

Non-Final Office Action issued in U.S. Appl. No. 14/927,569 dated Aug. 31, 2016.

*Primary Examiner* — Marivelisse Santiago Cordero
*Assistant Examiner* — Pawan Dhingra
(74) *Attorney, Agent, or Firm* — Rossi, Kimms & McDowell LLP

(57) ABSTRACT

An image forming system that is capable of preventing obstruction of transmission of a packet to an information processing apparatus from a USB device supporting USBNW due to the shift to the sleep mode. The image forming system includes an information processing apparatus, an image forming apparatus with a sleep mode, and a USB device that is connected to the information processing apparatus through the image forming apparatus and is controlled by the information processing apparatus. The image forming apparatus includes a first determination unit that determines whether the USB device supports USBNW, a second determination unit that determines whether a packet received from the information processing apparatus is processed by a module supporting USBNW, and a control unit that prohibits the image forming apparatus from shifting to the sleep mode when the USB device supports USBNW and
(Continued)

when the packet is processed by the module supporting USBNW.

10 Claims, 6 Drawing Sheets

(52) U.S. Cl.
CPC ..... *H04N 1/00209* (2013.01); *H04N 1/00891* (2013.01); *H04N 1/00896* (2013.01); *H04N 1/00904* (2013.01); *H04N 1/00925* (2013.01)

(56) References Cited

U.S. PATENT DOCUMENTS

| | | |
|---|---|---|
| 2007/0255918 A1 | 11/2007 | Suzuki |
| 2010/0262732 A1 | 10/2010 | Tseng et al. |
| 2011/0161711 A1 | 6/2011 | Takamoto |
| 2011/0188075 A1 | 8/2011 | Narushima et al. |
| 2011/0194147 A1 | 8/2011 | Kato |
| 2011/0296493 A1 | 12/2011 | Kim et al. |
| 2012/0026532 A1* | 2/2012 | Arimoto .................. H02J 9/005 358/1.14 |
| 2012/0176635 A1 | 7/2012 | Niitsuma |
| 2013/0042120 A1* | 2/2013 | Ono ..................... G06F 1/3225 713/300 |
| 2013/0072260 A1 | 3/2013 | Nair et al. |
| 2015/0058246 A1 | 2/2015 | Nail, III et al. |
| 2015/0333735 A1 | 11/2015 | Elias et al. |

\* cited by examiner

| REGISTERED DEVICE NUMBER 301 | DEVICE INFORMATION (VID/PID) 302 | FIRST DETERMINATION FLAG 303 | CLIENT-PC IDENTIFICATION INFORMATION 304 | SECOND DETERMINATION FLAG 305 |
|---|---|---|---|---|
| 1 | X | 0 | A | 0 |
| 2 | Y | 0 | B | 0 |
| 3 | Z | 0<->1 | C | 0<->1 |

300

IMAGE FORMING SYSTEM INCLUDING IMAGE FORMING APPARATUS THAT CAN PROHIBIT ENTRY INTO SLEEP MODE, CONTROL METHOD FOR IMAGE FORMING APPARATUS IN SYSTEM CONCERNED, AND STORAGE MEDIUM STORING CONTROL PROGRAM FOR IMAGE FORMING APPARATUS

BACKGROUND OF THE INVENTION

Field of the Invention

The present invention relates to an image forming system including an image forming apparatus with a sleep mode, a control method for the image forming apparatus in the system concerned, and a storage medium storing a control program for the image forming apparatus.

Description of the Related Art

There is a known image forming system that includes an image forming apparatus, an information processing apparatus, and a USB device (for example, see Japanese Laid-Open Patent Publication (Kokai) No. 2007-310796 (JP 2007-310796A)). In the image forming system described in the publication, the information processing apparatus is connected to the image forming apparatus through a network, the USB device is connected to the image forming apparatus without going through the network, and the information processing apparatus controls the USB device via the image forming apparatus. Such a control technique is called USBNW (USB Over Network) technique.

Moreover, there is an image forming apparatus that is provided with a plurality of electric power modes in order to reduce power consumption. The electric power modes include a normal mode in which electric power is supplied to all components and a sleep mode in which electric power is supplied to a part of the components, for example. This image forming apparatus changes the electric power mode to the sleep mode when it is not operated during a fixed period in the normal mode, and changes the electric power mode to the normal mode when it is operated in the sleep mode (for example, see Japanese Laid-Open Patent Publication (Kokai) No. 2014-104654 (JP 2014-104654A)).

Incidentally, the image forming apparatus in the image forming system of JP 2007-310796A may enter into the sleep mode. When the image forming apparatus enters into the sleep mode, the electric power is not supplied to the USB device from the image forming apparatus.

On the other hand, when an information processing apparatus transmits a packet to the image forming apparatus that is in the sleep mode, the image forming apparatus returns to the normal mode from the sleep mode and receives the packet transmitted from the information processing apparatus. The image forming apparatus that returned to the normal mode supplies the electric power to the USB device, and transmits the received packet to the USB device.

However, when the image forming apparatus is in the sleep mode, the image forming apparatus does not return to the normal mode from the sleep mode even if the USB device transmits a packet to the image forming apparatus. As a result, the image forming apparatus cannot receive the packet that the USB device transmitted, and cannot transmit the packet concerned to the information processing apparatus. That is, when the image forming apparatus shifts to the sleep mode, the USB device cannot transmit a packet to the information processing apparatus.

SUMMARY OF THE INVENTION

The present invention provides an image forming system, a control method for an image forming apparatus in the system concerned, and a storage medium storing a control program therefor, which are capable of preventing obstruction of transmission of a packet to an information processing apparatus from a USB device supporting USBNW due to the shift to the sleep mode.

Accordingly, a first aspect of the present invention provides an image forming system including an information processing apparatus, an image forming apparatus with a sleep mode, and a USB device that is connected to the information processing apparatus through the image forming apparatus and is controlled by the information processing apparatus. The image forming apparatus includes a first determination unit configured to determine whether the USB device supports USBNW, a second determination unit configured to determine whether a packet received from the information processing apparatus is processed by a module supporting USBNW, and a control unit configured to prohibit the image forming apparatus from shifting to the sleep mode when it is determined that the USB device supports USBNW and when it is determined that the packet is processed by the module supporting USBNW.

Accordingly, a second aspect of the present invention provides a control method for an image forming apparatus in an image forming system that includes an information processing apparatus, the image forming apparatus with a sleep mode, and a USB device that is connected to the information processing apparatus through the image forming apparatus and is controlled by the information processing apparatus. The control method includes a first determination step of determining whether the USB device supports USBNW, a second determination step of determining whether a packet received from the information processing apparatus is processed by a module supporting USBNW, and a control step of prohibiting the image forming apparatus from shifting to the sleep mode when it is determined that the USB device supports USBNW and when it is determined that the packet is processed by the module supporting USBNW.

Accordingly, a third aspect of the present invention provides a non-transitory computer-readable storage medium storing a control program causing a computer to execute the control method of the second aspect.

The present invention enables to prevent obstruction of transmission of a packet to an information processing apparatus from a USB device supporting USBNW due to the shift to the sleep mode.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
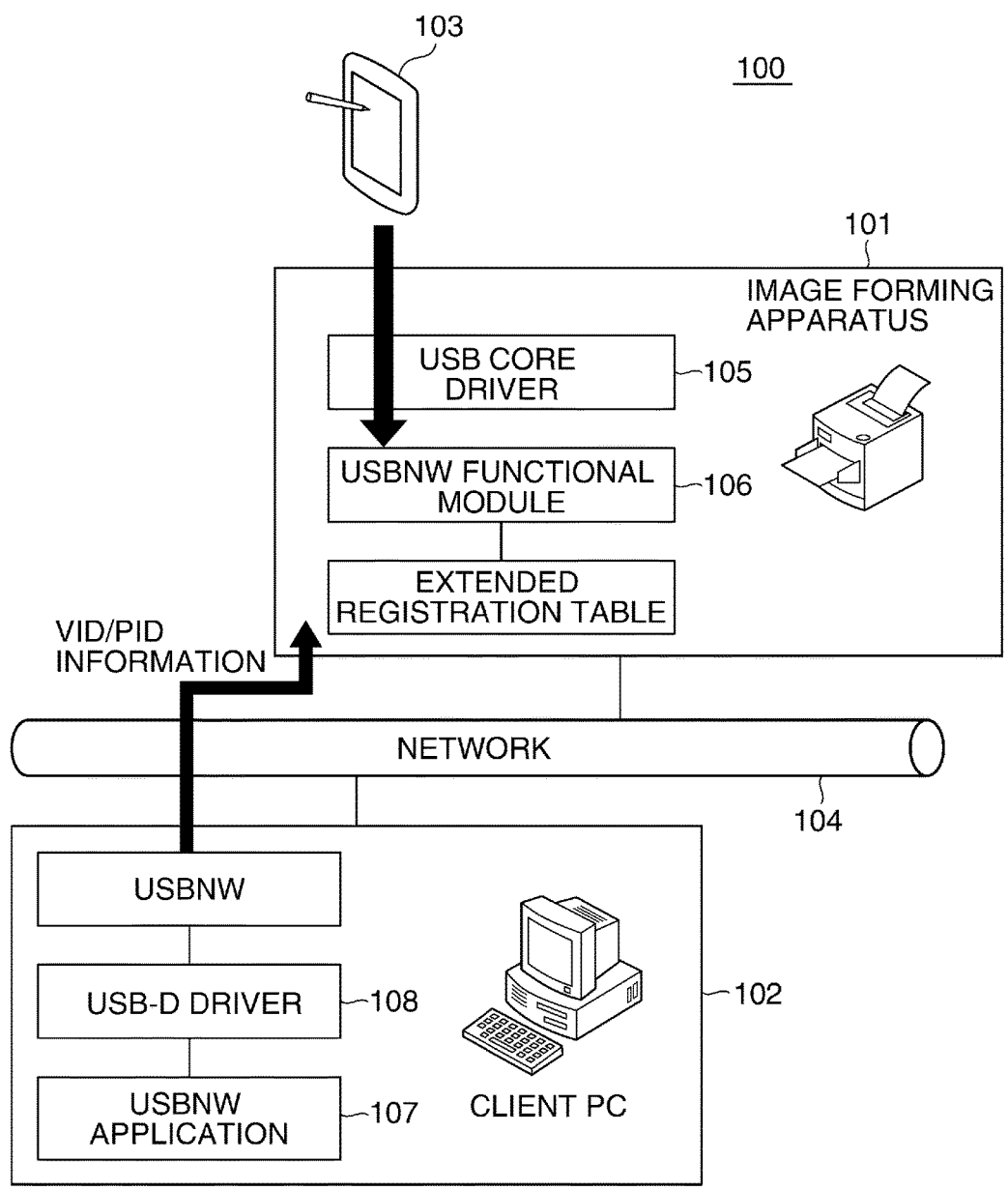
FIG. 1 is a block diagram illustrating an image forming system including an image forming apparatus according to an embodiment of the present invention.

FIG. 1 is a block diagram illustrating an image forming system 100 including an image forming apparatus 101 according to an embodiment of the present invention.

The image forming system 100 in FIG. 1 is provided with the image forming apparatus 101, a client PC 102 as an information processing apparatus, and a tablet terminal 103. The image forming apparatus 101 and the client PC 102 are connected through a network 104, and the image forming apparatus 101 and the tablet terminal 103 are connected through a USB I/F. Moreover, the image forming apparatus 101, the client PC 102, and the tablet terminal 103 support USBNW (USB Over Network).

The image forming apparatus 101 is provided with a USB core driver 105 and a USBNW functional module 106. The USB core driver 105 detects connection of a USB device, such as the tablet terminal 103, to the image forming apparatus 101, and obtains identification information about a USB device from the USB device concerned. It should be noted that a USB device has a device descriptor, and the identification information about the USB device is stored in the device descriptor. The USB core driver 105 obtains identification information about the USB device with reference to the device descriptor.

The USBNW functional module 106 processes a packet that is received from the client PC 102 and is used to control a USB device supporting USBNW (for example, the tablet terminal 103). Moreover, the USBNW functional module 106 manages an extended registration table 300 mentioned below.

The client PC 102 is provided with a USBNW application 107 and a USB-D driver 108. The USBNW application 107 is started when obtaining device information about a USB device supporting USBNW, such as vendor ID information (hereinafter referred to as "VID") and product ID information (hereinafter referred to as "PID") about the tablet terminal 103. Moreover, the USBNW application 107 is started when transmitting a packet to the image forming apparatus 101 for controlling the tablet terminal 103. The USB-D driver 108 is started when transmitting print data to a USB-D unit 212 mentioned below.

Figure 2:
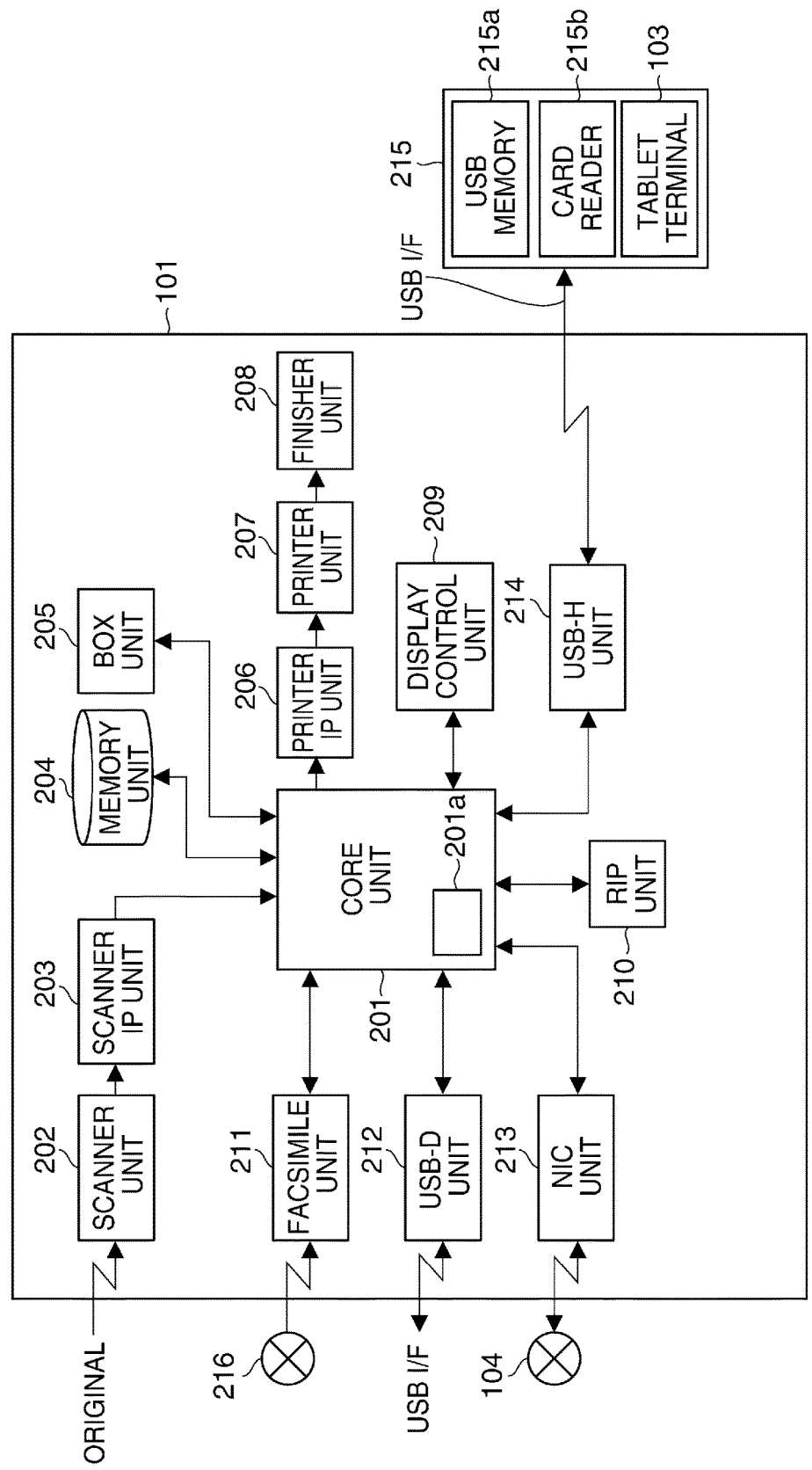
FIG. 2 is a block diagram illustrating an internal configuration of the image forming apparatus in FIG. 1.

FIG. 2 is a block diagram illustrating an internal configuration of the image forming apparatus 101 in FIG. 1.

As shown in FIG. 2, the image forming apparatus 101 is provided with a core unit 201, a scanner unit 202, a scanner IP unit 203, a memory unit 204, a box unit 205, a printer IP unit 206, a printer unit 207, a finisher unit 208, a display control unit 209, an RIP unit 210, a facsimile unit 211, the USB-D unit 212, an NIC unit 213, and a USB-H unit 214.

The scanner IP unit 203, the memory unit 204, the box unit 205, the printer IP unit 206, the display control module 209, the RIP unit 210, the facsimile unit 211, the USB-D unit 212, the NIC unit 213, and the USB-H unit 214 are mutually connected via the core unit 201. The scanner unit 202 is connected to the scanner IP unit 203. The finisher unit 208 is connected to the printer unit 207, and the printer unit 207 is connected to the printer IP unit 206. The facsimile unit 211 is connected to a telephone line 216. The USB-D unit 212 is connected to an external apparatus through a USB I/F. The NIC unit 213 is connected to the network 104 through a network I/F. USB devices 215 are connected to the USB-H unit 214 through a USB I/F.

The core unit 201 has a ROM 201a. The ROM 201a stores various programs, such as a program for controlling the entire image forming apparatus 101 and a boot program for starting an OS. Specifically, the ROM 201a stores the USB core driver 105 and the USBNW functional module 106. The core unit 201 controls the entire image forming apparatus 101 according to the programs stored in the ROM 201a.

The scanner unit 202 reads an original with a photoelectric conversion element, and generates an RGB digital image by performing an A/D conversion and a shading correction. The scanner IP unit 203 applies various image processes to the RGB digital image concerned. The memory unit 204 is a main memory of the core unit 201 and is used as a work memory when various processes are performed. The memory unit 204 stores various data.

The box unit 205 is a buffer space used when the image forming apparatus 101 transmits data to an external apparatus or data is received from an external apparatus. The printer IP unit 206 generates image data on the basis of the signal output from the core unit 201. The printer unit 207 prints the image data concerned on a recording sheet. The finisher unit 208 applies a staple process etc. to recording sheets on which image data has been printed by the printer unit 207. The display control unit 209 transmits an instruction from a user to the core unit 201, or displays an instruction from the core unit 201. The RIP unit 210 generates bitmap image data from image data. The facsimile unit 211 performs a facsimile communication through the telephone line 216.

The USB-D unit 212 receives print data from an external apparatus connected through the USB I/F. The NIC unit 213 obtains various data, such as image data and a packet, through the network 104. Moreover, the NIC unit 213 is controlled by a NW communication control driver (not illustrated). The NW communication control driver is software that recognizes that the NIC unit 213 obtained various data through the network 104 and analyzes the obtained data. The USB-H unit 214 controls the USB devices 215 connected through the USB I/F. The USB devices 215 include the tablet terminal 103, a USB memory 215a, and a card reader 215b, for example.

Figures 3, 4:
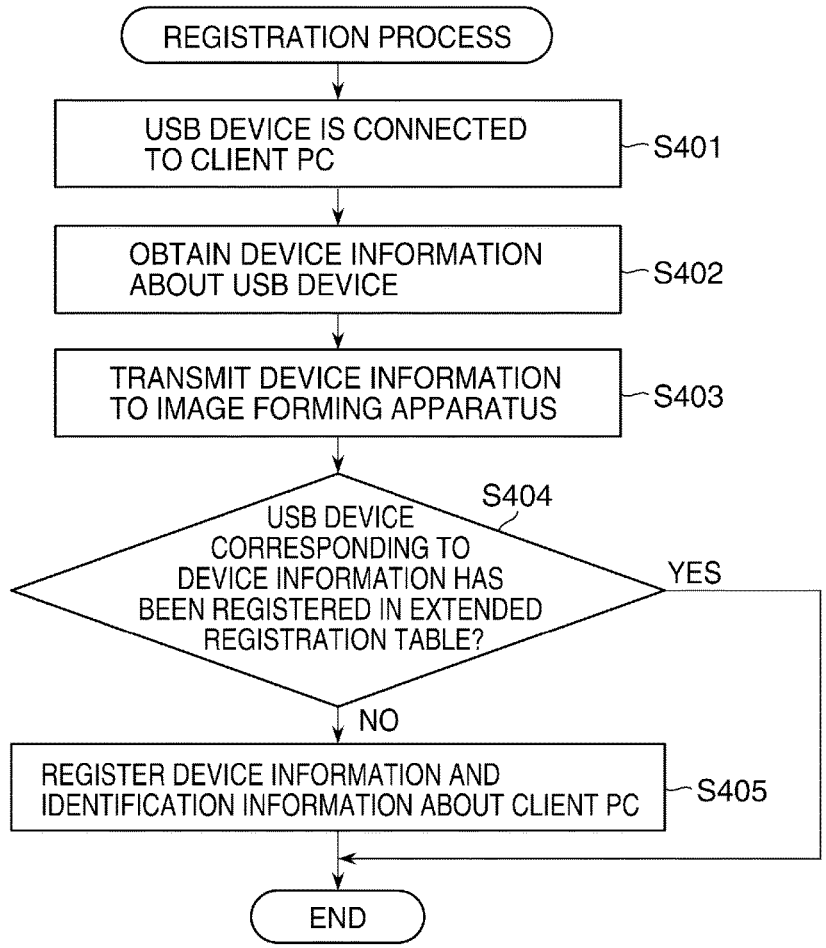
FIG. 3 illustrates an extended registration table stored in a memory unit in FIG. 2.
FIG. 4 is a flowchart illustrating procedures of a registration process for registering a USB device newly to the extended registration table in FIG. 3.

FIG. 3 illustrates the extended registration table 300 that is managed by the USBNW functional module 106 in FIG. 1.

In the extended registration table 300 in FIG. 3, a registered device number 301, device information 302, a first determination flag 303, client-PC identification information 304, and a second determination flag 305 are registered as device information about a USB device connected to the image forming apparatus 101 without going through the network.

The registered device number 301 is a number for managing a USB device registered in the extended registration table 300 (hereinafter referred to as a "registered device"). The device information 302 includes VID and PID of a registered device. The first determination flag 303 denotes "0" when a USB device supporting USBNW is not connected to the image forming apparatus 101, and denotes "1" when a USB device supporting USBNW is connected to the image forming apparatus 101. When a USB device that has not been registered in the extended registration table 300 is newly registered to the extended registration table 300 in a registration process in FIG. 4 mentioned later, the first determination flag 303 denotes "0".

The client-PC identification information 304 is identification information about the client PC 102 that controls the USB device connected to the image forming apparatus 101, and specifically, is a MAC address and an IP address. The second determination flag 305 denotes "0" when the USBNW functional module 106 does not process a packet received from the client PC 102, and denotes "1" when the USBNW functional module 106 processes a packet received from the client PC 102. When a USB device that has not been registered in the extended registration table 300 is newly registered to the extended registration table 300 in the registration process in FIG. 4 mentioned later, the second determination flag 305 denotes "0".

FIG. 4 is a flowchart illustrating procedures of the registration process for registering a USB device newly to the extended registration table 300 in FIG. 3.

As shown in FIG. 4, for example, the tablet terminal 103, which is a USB device that will be newly registered to the extended registration table 300, is connected to the client PC 102 (step S401). The client PC 102 obtains the VID and PID as the device information about the tablet terminal 103 from the tablet terminal 103 (step S402), and transmits the obtained VID and PID to the image forming apparatus 101 (step S403). Next, the image forming apparatus 101 receives the transmitted VID and PID, and the core unit 201 determines whether the tablet terminal 103 corresponding to the received VID and PID has been registered in the extended registration table 300 (step S404).

As a result of the determination in the step S404, when the tablet terminal 103 corresponding to the VID and PID that were received by the image forming apparatus 101 has been registered in the extended registration table 300, the process is finished instantly. On the other hand, when the tablet terminal 103 corresponding to the VID and PID that were received by the image forming apparatus 101 is not registered in the extended registration table 300, the core unit 201 registers the tablet terminal 103 as a new USB device to the extended registration table 300 (step S405), and finishes the process.

When the tablet terminal 103 was registered to the extended registration table 300 as a new USB device, the device information 302 concerning the tablet terminal 103 denotes the VID and PID of the tablet terminal 103, the first determination flag 303 denotes "0", the client-PC identification information 304 denotes the MAC address and IP address of the client PC 102 that transmitted the device information about the tablet terminal 103 to the image forming apparatus 101, and the second determination flag 305 denotes "0".

Figure 5:
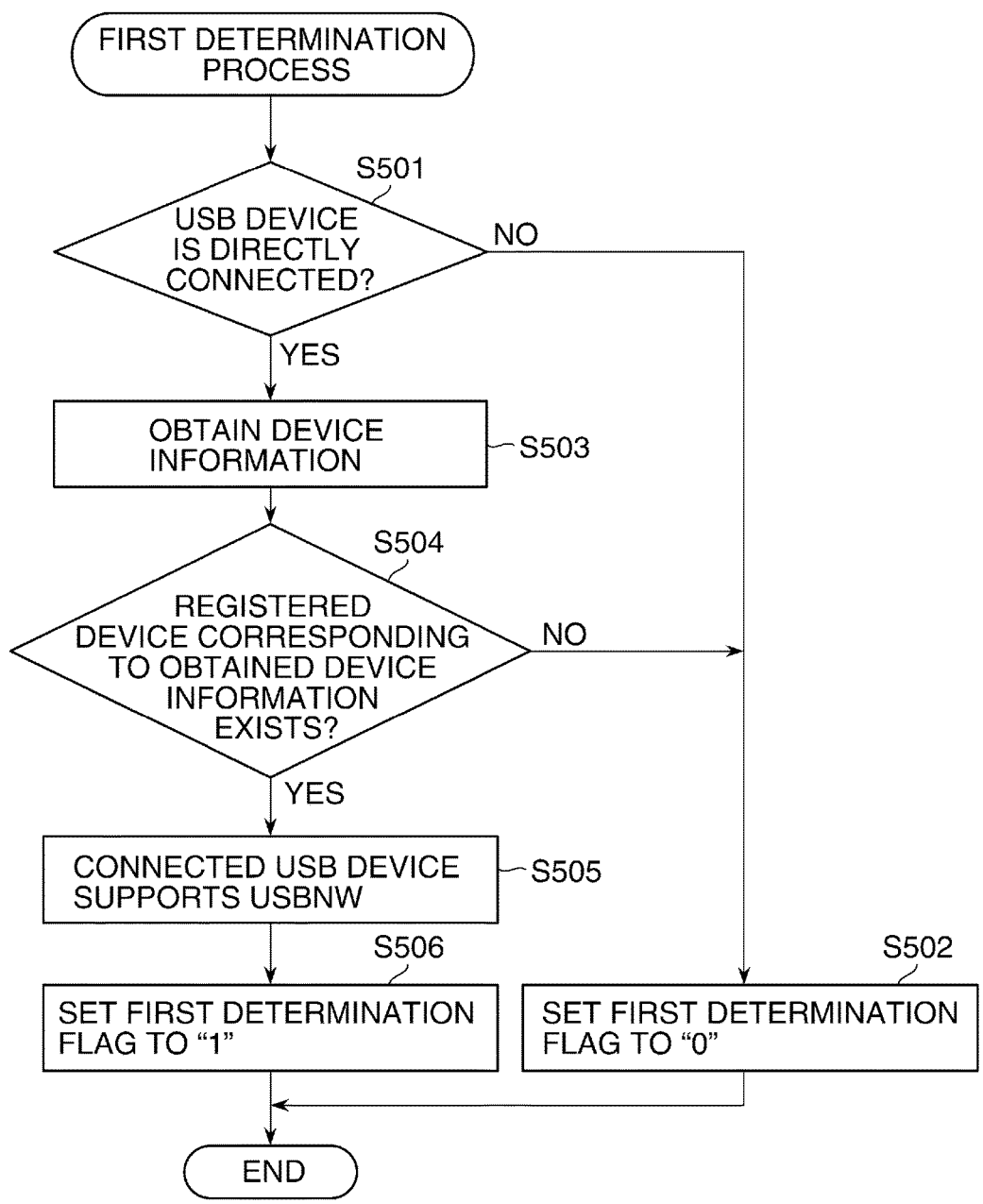
FIG. 5 is a flowchart illustrating procedures of a first determination process executed by a core unit in FIG. 2.

FIG. 5 is a flowchart illustrating procedures of a first determination process executed by the core unit 201 in FIG. 2.

As shown in FIG. 5, it is first determined whether a USB device, for example, the tablet terminal 103 is directly connected to the image forming apparatus 101 without going through the network (step S501). As a result of the determination in the step S501, when the tablet terminal 103 is not directly connected to the image forming apparatus 101, the first determination flag 303 is set to "0" (step S502), and this process is finished. On the other hand, when the tablet terminal 103 is directly connected to the image forming apparatus 101 without going through the network, the USB core driver 105 obtains the device information about the tablet terminal 103 with reference to the device descriptor of the tablet terminal 103 (step S503). The core unit 201 determines whether the registered device corresponding to the obtained device information about the tablet terminal 103 exists in the extended registration table 300 (step S504).

As a result of the determination in the step S504, when the registered device corresponding to the device information about the tablet terminal 103 does not exist in the extended registration table 300, the process proceeds to the step S502. On the other hand, when the registered device corresponding to the device information about the obtained tablet terminal 103 exists in the extended registration table 300, it is determined that the connected tablet terminal 103 supports USBNW (step S505), the first determination flag 303 is set to "1" (step S506), and this process is finished.

Figure 6:
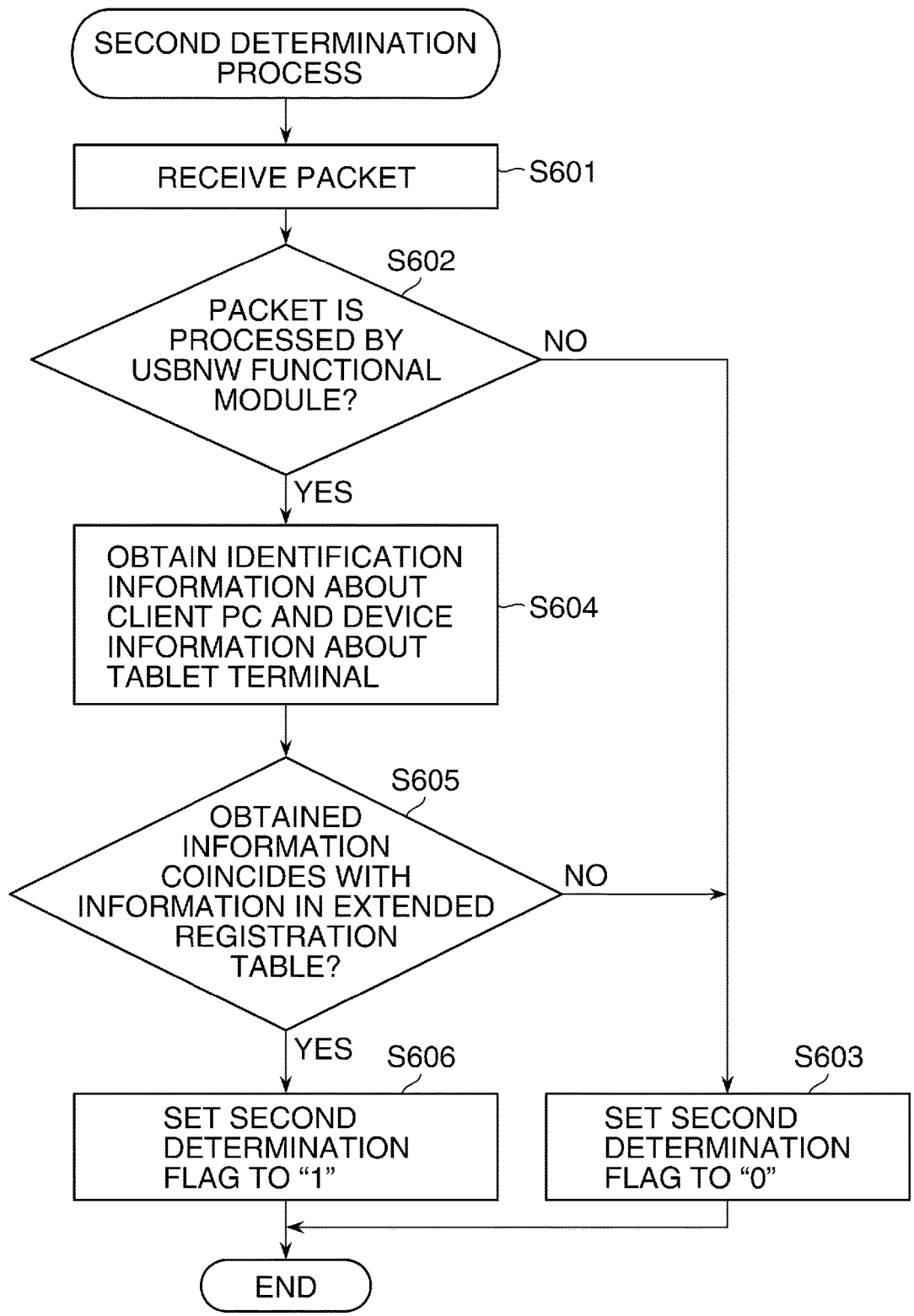
FIG. 6 is a flowchart illustrating procedures of a second determination process executed by the core unit in FIG. 2.

FIG. 6 is a flowchart illustrating procedures of a second determination process executed by the core unit 201 in FIG. 2. A description about the process in FIG. 6 premises that a USB device connected to the image forming apparatus 101 is the tablet terminal 103 and that a packet transmitted from the client PC 102 includes the identification information about the client PC 102 and the device information about the tablet terminal 103.

In FIG. 6, a packet from the client PC 102 is received first (step S601). The NW communication control driver analyzes the received packet, and the core unit 201 determines whether the received packet is processed by the USBNW functional module 106 on the basis of the analysis result about the packet (step S602). As a result of the determination in the step S602, when the received packet is not processed by the USBNW functional module 106, the second decision flag 305 is set to "0" (step S603), and this process is finished. On the other hand, when the received packet is processed by the USBNW functional module 106, the identification information about the client PC 102 that transmitted the packet and the device information about the tablet terminal 103 are obtained from the packet (step S604). Subsequently, it is determined whether the obtained identification information about the client PC 102 and the obtained device information about the tablet terminal 103 respectively coincide with the client-PC identification information 304 and the device information 302 about the registered device corresponding to the tablet terminal 103 in the extended registration table 300 (step S605).

As a result of the determination in the step S605, when the obtained identification information about the client PC 102 and the obtained device information about the tablet terminal 103 do not respectively coincide with the client-PC identification information 304 and the device information 302 about the registered device corresponding to the tablet terminal 103 in the extended registration table 300, the process proceeds to the step S603. On the other hand, when the obtained identification information about the client PC 102 and the obtained device information about the tablet terminal 103 respectively coincide with the client-PC identification information 304 and the device information 302 about the registered device corresponding to the tablet terminal 103 in the extended registration table 300, the image forming apparatus 101 determines that the client PC 102 that transmitted the packet corresponds to the tablet terminal 103, permits the client PC 102 to control the tablet terminal 103 with USBNW, sets the second determination flag 305 to "1" (step S606), and finishes this process.

Figure 7:
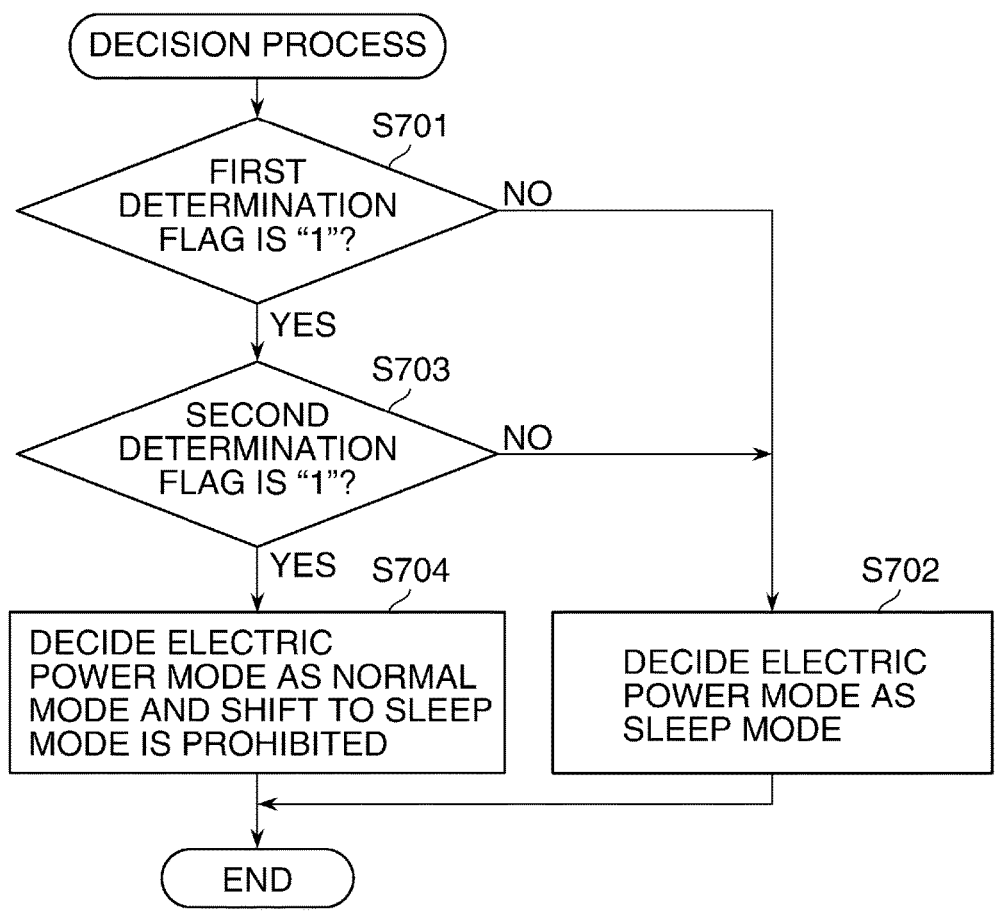
FIG. 7 is a flowchart illustrating procedures of a decision process by which an electric power mode of the image forming apparatus is determined on the basis of a first determination flag and a second determination flag in FIG. 3.

FIG. 7 is a flowchart illustrating procedures of a decision process by which an electric power mode of the image forming apparatus 101 is determined on the basis of the first determination flag 303 and the second determination flag 305 in FIG. 3.

The decision process in FIG. 7 is executed by the core unit 201 when the image forming apparatus 101 is not operated while a definite period of time elapses. Moreover, a description about the process in FIG. 7 premises that a USB device connected to the image forming apparatus 101 is the tablet terminal 103 as with the description about the process in FIG. 6.

As shown in FIG. 7, it is first determined whether the first determination flag 303 denotes "1" (step S701). As a result of the determination in the step S701, when the first determination flag 303 denotes "0", the electric power mode of the image forming apparatus 101 is decided as the sleep mode (step S702), and this process is finished. On the other hand, when the first determination flag 303 denotes "1", it is determined whether the second determination flag 305 denotes "1" (step S703).

As a result of the determination in the step S703, when the second determination flag 305 denotes "0", the process proceeds to the step S702. On the other hand, when the second determination flag 305 denotes "1", the electric power mode of the image forming apparatus 101 is decided as a normal mode and the shift to the sleep mode is prohibited (step S704), and this process is finished.

According to the process in FIG. 7, when the first determination flag 303 denotes "1" (YES in the step S701) that shows that the tablet terminal 103 is connected to the image forming apparatus 101, and when the second determination flag 305 denotes "1" (YES in the step S703), the shift to the sleep mode is prohibited (step S704). Accordingly, when the tablet terminal 103 is connected to the image forming apparatus 101, and even if the image forming apparatus 101 is not operated while the definite period of time elapses, the image forming apparatus 101 does not shift to the sleep mode and the normal mode is maintained. This allows the image forming apparatus 101 to receive the packet that is transmitted by the tablet terminal 103. This enables to prevent obstruction of the transmission of the packet to the client PC 102 from the tablet terminal 103 supporting USBNW due to the shift to the sleep mode.

However, even if the first determination flag 303 denotes "1" (YES in the step S701) and the second determination flag 303 denotes "1" (YES in the step S703), the image forming apparatus 101 may shift to the sleep mode when the tablet terminal 103 does not receive the packet transmitted by the image forming apparatus 101. The tablet terminal 103 that does not receive the packet transmitted by the image forming apparatus 101 does not support USBNW and is uncontrollable by the client PC 102. Accordingly, when the image forming apparatus 101 shifts to the sleep mode, the electric power is not supplied to the tablet terminal 103 that does not support USBNW, which reduces useless power consumption.

Furthermore, when the first determination flag 303 denotes "1" (YES in the step S701) and the second determination flag 303 denotes "1" (YES in the step S703), a user may be prohibited to set up the electric power mode through the display control unit 209. This prevents a user, who does not know that the shift to the sleep mode is unsuitable in order to prevent obstruction of transmission of a packet to the client PC 102 from the tablet terminal 103 supporting USBNW, from setting the electric power mode to the sleep mode through the display control module 209.

Moreover, according to the process in FIG. 5, when the registered device corresponding to the obtained device information about the tablet terminal 103 connected to the image forming apparatus 101 exists in the extended registration table 300 (YES in the step S504), the first determination flag 303 is set to "1". Since the first determination flag 303 denotes "1" when a USB device supporting USBNW is connected to the image forming apparatus 101, the connection of the tablet terminal 103 supporting USBNW is easily determined on the basis of whether the first determination flag 303 denotes "1".

According to the process in FIG. 6, when the received packet is processed by the USBNW functional module 106 (YES in the step S602), and when the obtained identification information about the client PC 102 and the obtained device information about the tablet terminal 103 respectively coincide with the client-PC identification information 304 and the device information 302 about the registered device corresponding to the tablet terminal 103 in the extended registration table 300 (YES in the step S605), it is determined that the client PC 102 that transmitted the packet corresponds to the tablet terminal 103, and the client PC 102 is allowed to control the tablet terminal 103 with USBNW (step S606). Accordingly, the client PC 102 that is not managed by the image forming apparatus 101 is prevented from controlling the USB device connected to the image forming apparatus 101, which improves the security level of the image forming apparatus 101 in the image forming system 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-227876, filed Nov. 10, 2014, which is hereby incorporated by reference herein in its entirety.

What is claimed is:

1. An image forming apparatus comprising:
   a first interface configured to connect the image forming apparatus to a network;
   a second interface configured to connect the image forming apparatus and a USB device to each other through a USB interface, wherein the USB device supports a control function in which an external apparatus on the network controls the USB device through the image forming apparatus;
   a processor; and
   a memory having stored thereon instructions that when executed by the processor, cause the processor to:
   determine whether a packet received from an information processing apparatus on the network through the first interface is a packet for controlling the USB device being connected to the image forming apparatus through the second interface; and
   prohibit, based on the determination that the packet received from the information processing apparatus on the network through the first interface is the packet for controlling the USB device being connected to the image forming apparatus through the second interface, the image forming apparatus from shifting to a sleep mode in which communication between the information processing apparatus and the USB device is obstructed.

2. The image forming apparatus according to claim 1, wherein the image forming apparatus is permitted to shift to the sleep mode based on the determination that the packet received from the information processing apparatus on the network through the first interface is not the packet for controlling the USB device being connected to the image forming apparatus through the second interface.

3. An image forming apparatus comprising:
   a first interface configured to connect the image forming apparatus to a network;
   a second interface configured to connect the image forming apparatus and a USB device to each other through a USB interface, wherein the USB device supports USB Over Network in which an external apparatus on the network controls the USB device through the image forming apparatus;
   a processor; and
   a memory having stored thereon instructions that when executed by the processor, cause the processor to:
   determine whether a packet received from an information processing apparatus on the network through the first interface is a packet for controlling the USB device being connected to the image forming apparatus through the second interface;
   set, based on the determination that the packet received from the information processing apparatus on the network through the first interface is the packet for controlling the USB device being connected to the image forming apparatus through the second interface, a flag indicating whether the image forming apparatus shifts to a sleep mode in which communication between the information processing apparatus and the USB device being connected to the image forming apparatus through the second interface is obstructed; and
   determine whether the flag is set in a case where the image forming apparatus is not operated for a period of time,
   wherein the image forming apparatus does not shift to the sleep mode based on the determination that the flag indicating whether the image forming apparatus shifts to the sleep mode in which communication between the information processing apparatus and the USB device being connected to the image forming apparatus through the second interface is obstructed is set.

4. The image forming apparatus according to claim 3, wherein the image forming apparatus shifts to the sleep mode based on the determination that the flag indicating whether the image forming apparatus shifts to the sleep mode in which communication between the information processing apparatus and the USB device being connected to the image forming apparatus through the second interface is obstructed is not set.

5. A control method for an image forming apparatus including a first interface configured to connect the image forming apparatus to a network, and a second interface configured to connect the image forming apparatus and a USB device to each other through a USB interface, the USB device supporting a control function in which an external apparatus on the network controls the USB device through the image forming apparatus, the method comprising:
   determining whether a packet received from an information processing apparatus on the network through the first interface is a packet for controlling the USB device being connected to the image forming apparatus through the second interface; and
   prohibiting, based on the determination that the packet received from the information processing apparatus on the network through the first interface is the packet for controlling the USB device being connected to the image forming apparatus through the second interface, the image forming apparatus from shifting to a sleep mode in which communication between the information processing apparatus and the USB device is obstructed.

6. A control method for an image forming apparatus including a first interface configured to connect the image forming apparatus to a network, and a second interface configured to connect the image forming apparatus and a USB device to each other through a USB interface, the USB device supporting USB Over Network in which an external apparatus on the network controls the USB device through the image forming apparatus, the method comprising:
   determining whether a packet received from an information processing apparatus on the network through the first interface is a packet for controlling the USB device being connected to the image forming apparatus through the second interface;
   setting, based on the determination that the packet received from the information processing apparatus on the network through the first interface is the packet for controlling the USB device being connected to the image forming apparatus through the second interface, a flag indicating whether the image forming apparatus shifts to a sleep mode in which communication between the information processing apparatus and the USB device being connected to the image forming apparatus through the second interface is obstructed; and
   determining whether the flag is set in a case where the image forming apparatus is not operated for a period of time, wherein the image forming apparatus does not shift to the sleep mode based on the determination that the flag indicating whether the image forming apparatus shifts to the sleep mode in which communication between the information processing apparatus and the USB device being connected to the image forming apparatus through the second interface is obstructed is set.

7. A printing apparatus that is connected to a USB device and that is connected to an information processing apparatus via a network to which the USB device is not connected, the printing apparatus comprising:
a network interface configured to transmit, to the information processing apparatus, content information of a packet received from the USB device, and receive, from the information processing apparatus, a packet for controlling the USB device that is being connected to the printing apparatus; and
a controller configured to shift the printing apparatus to which the USB device is being connected and which is in a first electric power state where the printing apparatus is capable of communicating with the USB device, to a second power state where power consumption is less than the first power state and the printing apparatus is incapable of communicating with the USB device, according to a transition condition to the second power state,
wherein the controller determines whether or not the network interface of the printing apparatus to which the USB device is being connected has received, from the information processing apparatus, a packet for controlling the USB device which is being connected to the printing apparatus, and prohibits, based on the results of the determination, the printing apparatus to which the USB device is being connected, from shifting to the second electric power state.

8. The printing apparatus according to claim 7, wherein the controller is configured to:
store a predetermined flag if the controller receives, from the information processing apparatus through the network interface, the packet for controlling the USB device that is being connected to the printing apparatus, before the transition condition is satisfied,
refer to the stored predetermined flag after the transition condition has been satisfied, and
prohibit the printing apparatus, to which the USB device is being connected, from shifting to the second electric power state, based on the referred predetermined flag.

9. The printing apparatus according to claim 7, wherein the controller is configured to:
store identification information of an apparatus that is capable of controlling, through the printing apparatus, the USB device that is being connected to the printing apparatus,
determine whether or not the identification information of the information processing apparatus included in the packet received through the network interface coincides with the stored identification information, and
determine whether or not the packet including the identification information that is determined to coincide with the stored identification information is a packet for controlling the USB device that is being connected to the printing apparatus.

10. The printing apparatus according to claim 7, wherein the controller is further configured to register an information processing apparatus from which a packet for controlling the USB device being connected to the printing apparatus will be received, obtain information indicating a sender of a packet that the network interface has received via the network, and determine, based on the obtained information, whether or not the network interface has received the packet for controlling the USB device being connected to the printing apparatus from the registered information processing apparatus.

* * * * *